United States Patent
Suitou et al.

(10) Patent No.: US 6,505,473 B2
(45) Date of Patent: Jan. 14, 2003

(54) VEHICLE AIR CONDITIONER AND METHOD FOR CONTROLLING VEHICLE AIR CONDITIONER

(75) Inventors: Ken Suitou, Kariya (JP); Kazuya Kimura, Kariya (JP); Masahiro Kawaguchi, Kariya (JP); Ryo Matsubara, Kariya (JP); Satoshi Umemura, Kariya (JP); Kazuki Najima, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/132,928

(22) Filed: Apr. 26, 2002

(65) Prior Publication Data

US 2002/0157410 A1 Oct. 31, 2002

(30) Foreign Application Priority Data

Apr. 27, 2001 (JP) ........................ 2001-131522

(51) Int. Cl.$^7$ .............................. F25B 1/00; B60H 1/32
(52) U.S. Cl. ......................... 62/133; 62/228.3
(58) Field of Search ................ 62/133, 228.3, 62/228.5; 417/222.2

(56) References Cited

U.S. PATENT DOCUMENTS 6,356,825 B1 * 3/2002 Takenaka et al. ............. 701/36
6,434,956 B1 * 8/2002 Ota et al. ................ 62/228.3 X

FOREIGN PATENT DOCUMENTS

| EP | 1074800 | 2/2001 | ........... F25B/49/02 |
| JP | 6-42388 | 2/1994 | ........... F02D/41/16 |

* cited by examiner

Primary Examiner—William Wayner
(74) Attorney, Agent, or Firm—Morgan & Finnegan, LLP (57) ABSTRACT

A vehicle air conditioner including a refrigerant circuit that incorporates a variable displacement compressor driven by an engine of the vehicle. The air conditioner includes a control valve for varying the displacement of the compressor and an ECU for controlling the control valve. The control valve has a bellows, a valve body, and a coil. The ECU varies the displacement of the compressor by energizing the coil to apply a force, which counters the movement of the bellows, to the valve body to move the valve body. This alters the moved amount of the bellows. The air conditioner control unit gradually changes the force applied to the valve body by the coil to adjust the pressure difference and vary the displacement of the compressor when the engine is running at an idle speed.

16 Claims, 6 Drawing Sheets

VEHICLE AIR CONDITIONER AND METHOD FOR CONTROLLING VEHICLE AIR CONDITIONER

BACKGROUND OF THE INVENTION

The present invention relates to an apparatus and method for controlling a vehicle air conditioner having a variable displacement compressor.

In the prior art, when an engine of a vehicle is idling, the activation of a variable displacement compressor, which is incorporated in an air conditioner of the vehicle, results in the execution of idle-up control, which increases the idle speed of the engine. The increase in the idle speed produces the torque required to drive the compressor and prevents the engine from stalling. Further, the increase in the idle speed enables the compressor to cope with high cooling loads.

There is a recent trend for decreasing the idle speed to improve fuel efficiency. However, the execution of the idle-up control when the compressor is activated decreases fuel efficiency.

The prior art idle-up control is always executed when the engine is idling and the compressor is activated. Accordingly, the idle speed fluctuates whenever the compressor is activated or deactivated. This increases the vibrations and noise of the vehicle.

Further, the increased amount of the idle speed during the idle-up control is determined presuming that the torque required to drive the compressor is maximal, that is, the displacement of the compressor is maximal. Accordingly, if, for example, the displacement of the compressor is small and the torque required to drive the compressor is low, the idle speed is increased in an unnecessary manner. This is not desirable from the viewpoint of fuel efficiency.

SUMMARY OF THE INVENTION

It is an object of the present invention to provide an apparatus and method for controlling the displacement of a variable displacement compressor in accordance with the engine idle speed.

To achieve the above object, the present invention provides a vehicle air conditioner including a refrigerant circuit that incorporates a variable displacement compressor driven by an engine of the vehicle. The air conditioner includes a control valve for varying the displacement of the compressor. An air conditioner control unit controls the control valve. The control valve includes a pressure sensing mechanism having a valve body and a pressure sensing member connected to the valve body and moved in accordance with a pressure difference between two pressure monitoring points located along the refrigerant circuit. The pressure difference corresponds to the displacement of the compressor and alters the moved amount of the pressure sensing member. A pressure difference adjusting actuator is controlled by the air conditioner control unit. The pressure difference adjusting actuator applies a force, which counters the movement of the pressure sensing member, to the valve body to move the valve body and alter the moved amount of the pressure sensing member. The pressure difference adjusting actuator further adjusting the force applied to the valve body to alter the moved amount of the pressure sensing member and vary the displacement of the compressor. The air conditioner control unit changes the force of the pressure difference adjusting actuator applied to the valve body to adjust the pressure difference and vary the displacement of the compressor. The changes in force when the engine is running at an idle speed is more gradual than when the engine is running at a speed other than the idle speed.

A further perspective of the present invention is a method for controlling a vehicle air conditioner including a refrigerant circuit that incorporates a variable displacement compressor driven by an engine of the vehicle, a pressure sensing mechanism, and a pressure difference adjusting actuator. The pressure sensing mechanism has a valve body and a pressure sensing member, which is connected to the valve body and moved in accordance with the pressure difference between two pressure monitoring points located along the refrigerant circuit. The pressure difference adjusting actuator applies a force, which counters the movement of the pressure sensing member, to the valve body to move the valve body, and changes the force applied to the valve body to alter the moved amount of the pressure sensing member, adjust the pressure difference, and vary the displacement. The method includes changing the force of the pressure difference adjusting actuator applied to the valve body to adjust the pressure difference and vary the displacement of the compressor when the engine is running at an idle speed. The changes in force when the engine is running at the idle speed are more gradual than when the engine is running at a speed other than the idle speed.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be discussed with reference to the drawings.

[Air Conditioner and Idle Speed Control Apparatus]

Figure 1:
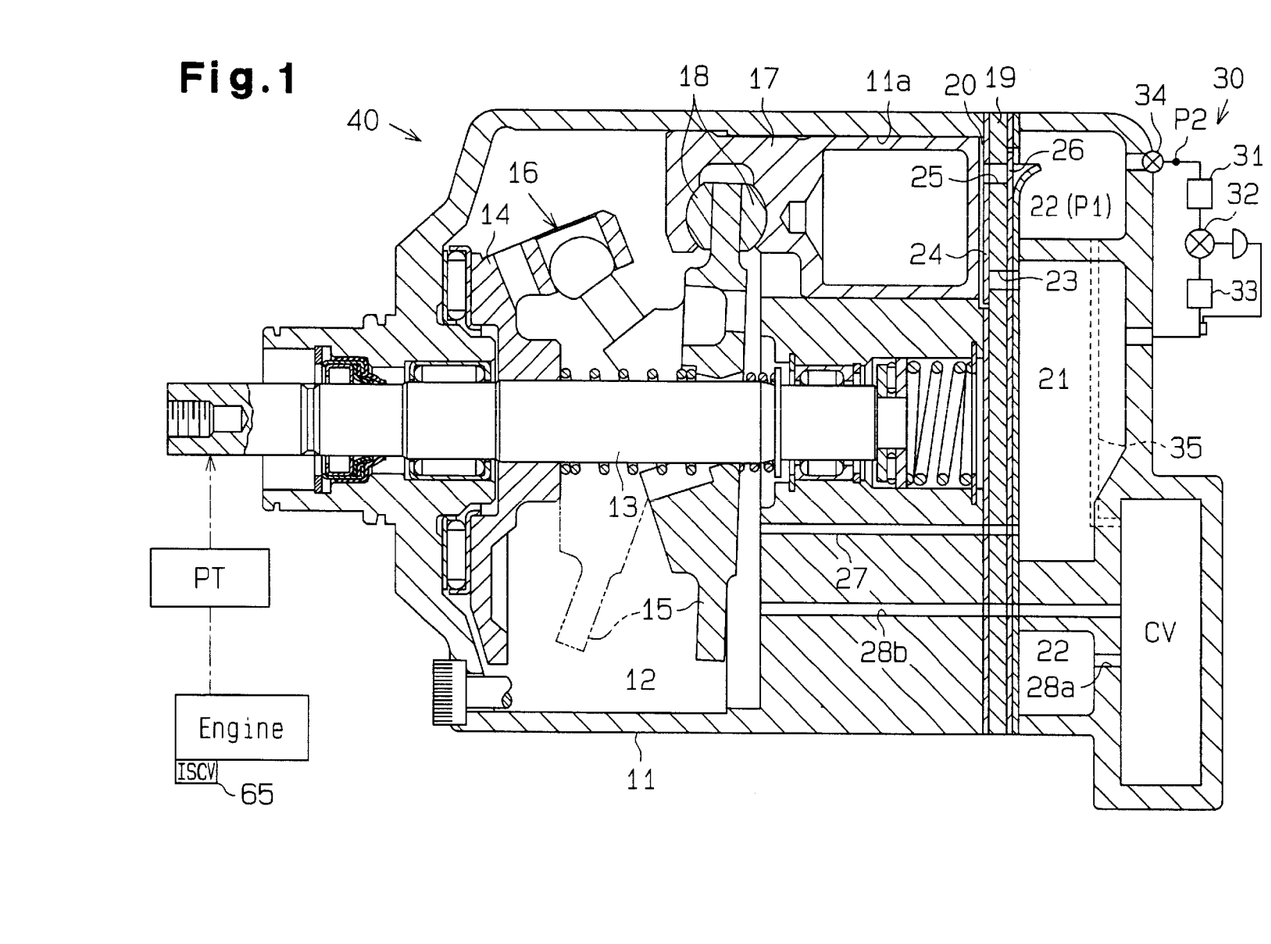
FIG. 1 is a cross-sectional view of a variable displacement compressor according to a preferred embodiment of the present invention.

Referring to FIG. 1, an engine E, which is a drive source of a vehicle, includes an idle speed control valve (ISCV) 65. When the engine E is idling, the ISCV 65 functions to adjust the amount of the intake air drawn into the engine E.

The engine E has an output shaft, which is connected to a swash plate type variable displacement compressor 40 by means of a power transmission mechanism PT. The compressor 40 is included in a refrigerant circuit (refrigerating cycle).

Figure 2:
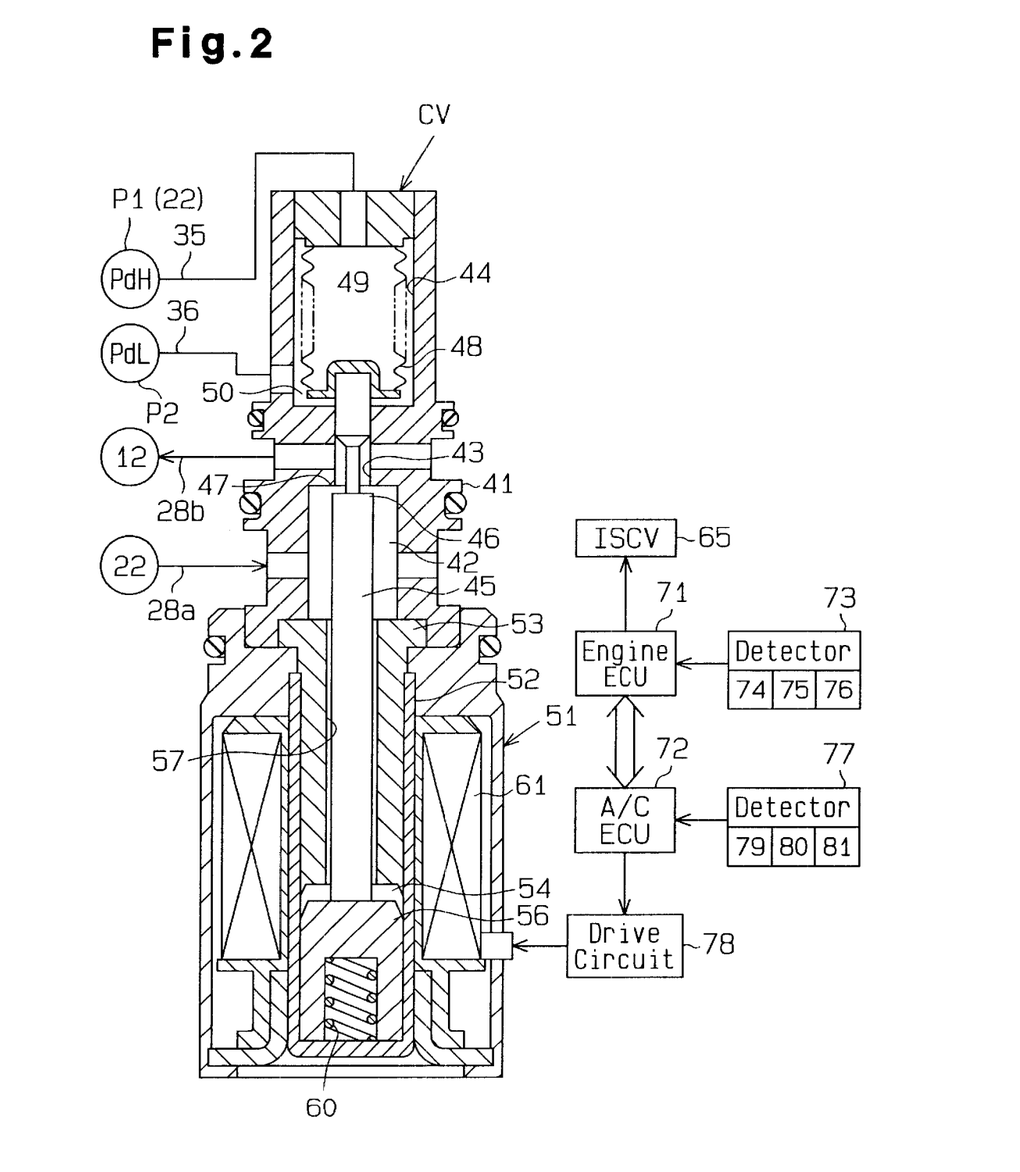
FIG. 2 is a cross-sectional view showing a control valve incorporated in the compressor of FIG. 1.

Referring to FIG. 2, the vehicle is provided with an engine ECU 71, which controls the ISCV 65, and an air conditioner (A/C) ECU 72. The engine ECU 71 and the A/C ECU 72 communicate with each other. The engine ECU 71 functions to control the idle speed and alter a target idle speed. The A/C ECU 72 functions to control the compressor 40 and also functions to change the target idle speed.

The engine ECU 71 is connected to a vehicle state detector 73. The vehicle state detector 73 includes a vehicle velocity sensor 74, an engine speed sensor 75, and a throttle position sensor 76. The vehicle velocity sensor 74 detects the traveling velocity of the vehicle. The engine speed sensor 75 detects the engine speed. The throttle position sensor 76 detects the angle of a throttle (not shown) that changes in accordance with the depressed amount of an acceleration pedal (not shown).

The A/C ECU 72 is connected to an A/C state detector 77. The A/C state detector 77 includes an A/C switch 79, a temperature setting device 80, and a temperature sensor 81, which generate signals provided to the A/C ECU 72. The A/C switch 79 is used to activate and deactivate the air conditioner and generates a signal indicating whether the air conditioner is activated. The temperature setting device 80 is used to set a target temperature $Te_{set}$ of the passenger compartment (not shown) and generates a signal indicating the target temperature $Te_{set}$. The temperature sensor 81 detects the actual temperature $Te_t$ of the passenger compartment and generates a signal indicating the detected temperature $Te_t$.

[Compressor]

Referring to FIG. 1, the compressor 40 has a housing 11. A crank chamber 12 is defined in the housing 11. A drive shaft 13 is rotatably arranged in the crank chamber 12. The drive shaft 13, which is connected to the engine E by the power transmission mechanism PT, is rotated by the engine E.

In the preferred embodiment, the power transmission mechanism PT does not have a clutch mechanism. Thus, the power of the engine E is constantly transmitted to the compressor 40. However, the power transmission mechanism PT may be provided with a clutch (e.g., electromagnetic clutch) that disconnects the compressor 40 from the engine E.

A lug plate 14 is fixed to the drive shaft 13 in the crank chamber 12 and rotates integrally with the drive shaft 13. A swash plate 15 is accommodated in the crank chamber 12. The swash plate 15 is supported so that it inclines as it moves along the drive shaft 13. A hinge mechanism 16 is arranged between the lug plate 14 and the swash plate 15. The hinge mechanism 16 enables the swash plate 15 to incline while rotating integrally with the lug plate 14 and the drive shaft 13.

A plurality of cylinder bores 11a (only one shown in FIG. 1) are formed in the housing 11. A piston 17 is reciprocally retained in each cylinder bore 11a. Each piston 17 is engaged with the peripheral portion of the swash plate 15 by a pair of shoes 18. As the drive shaft 13 rotates, the shoes 18 convert the rotating motion of the swash plate 15 to the reciprocating motion of the piston 17.

A valve plate 19 is arranged at the rear (toward the right as viewed in FIG. 1) of the cylinder bores 11a. A compression chamber 20 is defined in each cylinder bore 11a between the associated piston 17 and the valve plate 19. A suction chamber 21 and a discharge chamber 22 are defined in the rear portion of the housing 11.

As each piston 17 moves from its top dead center position to its bottom dead center position, refrigerant gas is drawn from the suction chamber 21 into the associated compression chamber 20 through a suction port 23 and a suction valve 24, which are formed in the valve plate 19. The refrigerant gas drawn into the compression chamber 20 is compressed to a predetermined pressure as the piston 17 moves from the bottom dead center position to the top dead center position. Then, the refrigerant gas is discharged into the discharge chamber 22 through a discharge port 25 and a discharge valve 26, which are formed in the valve plate 19.

[Displacement Control Mechanism of Compressor]

As shown in FIG. 1, a bleeding passage 27, a first gas supplying passage 28a, and a second gas supplying passage 28b are provided in the housing 11. The bleeding passage 27 connects the crank chamber 12 to the suction chamber 21. The first and second gas supplying passages 28a, 28b connect the discharge chamber to the crank chamber 12. A control valve CV is arranged between the first and second gas supplying passages 28a, 28b in the housing 11.

An opened amount of the control valve CV is varied to adjust the amount of high pressure discharge gas sent into the crank chamber 12 through the first and second gas supplying passages 28a, 28b and the amount of gas sent out from crank chamber 12 through the bleeding passage 27. In other words, the control valve CV controls the balance between the gas amount sent into the crank chamber 12 and the gas amount sent out from the crank chamber 12 to determine the pressure of the crank chamber 12. The pressure of the crank chamber 12 is changed to adjust the difference between the pressure of the crank chamber 12 and the pressure of the compression chambers 20, which act on the pistons 17. This changes the inclination of the swash plate 15, alters the stroke of the pistons 17, and varies the displacement of the compressor 40.

For example, when the pressure of the crank chamber 12 decreases, the inclination of the swash plate 15 increases, and the displacement of the compressor 40 increases. The broken lines in FIG. 1 show the swash plate 15 arranged at a maximum inclination position. In this state, the swash plate 15 is in contact with the lug plate 14. This restricts further inclination of the swash plate 15. When the pressure of the crank chamber 12 increases and the inclination of the swash plate 15 decreases, the displacement of the compressor 40 decreases. The solid lines in FIG. 1 show the swash plate 15 arranged at a minimum inclination position. In this state, the swash plate 15 is inclined relatively to a plane perpendicular to the axis of the drive shaft 13 at an angle that is slightly greater than zero.

[Refrigerant Circuit]

Referring to FIG. 1, a refrigerant circuit (refrigerating cycle) of the vehicle air conditioner is formed by the compressor 40 and an external refrigerant circuit 30. The external refrigerant circuit 30 includes a condenser 31, an expansion valve 32, and an evaporator 33.

In the refrigerant circuit, a shutting valve 34 is arranged between the discharge chamber 22 of the compressor 40 and the condenser 31. The shutting valve 34 shuts the passage between the discharge chamber 22 and the condenser 31 when the pressure of the discharge chamber 22 is lower than a predetermined value to stop circulating refrigerant through the external refrigerant circuit 30.

The shutting valve 34 may be a differential valve that detects the difference between the pressure at its upstream side and the pressure at its downstream side and functions in accordance with the pressure difference. Alternatively, the shutting valve 34 may be an electromagnetic valve controlled by the A/C ECU 72 in accordance with the detection of a discharge pressure sensor (not shown). Further, the shutting valve 34 may be a valve that closes mechanically when the swash plate 15 is arranged at the minimum inclination position.

The refrigerant circuit includes a first pressure monitoring point P1 and a second pressure monitoring point P2. The first pressure monitoring point P1 is located in the discharge chamber P1. The second pressure monitoring point P2 is arranged downstream of the first pressure monitoring point P1, or between the shutting valve 34 and the condenser 31. The difference between the pressure PdH at the first pressure monitoring point P1 and the pressure PdL at the second pressure monitoring point P2 reflects the amount of refrigerant flowing through the refrigerant circuit. The first pressure monitoring point P1 and the control valve CV are connected by a first pressure detection passage 35. The second pressure monitoring point P2 and the control valve CV are connected by a second pressure detection passage 36 (FIG. 2).

[Control Valve]

As shown in FIG. 2, the control valve CV has a valve housing 41 in which a valve chamber 42, a communication passage 43, and a pressure sensing chamber 44 are defined. A rod 45, which is movable in its axial direction, is arranged in the valve chamber 42 and the communication passage 43. The top portion of the rod 45, which is inserted in the communication passage 43, disconnects the communication passage 43 from the pressure sensing chamber 44. The valve chamber 42 is connected to the discharge chamber 22 by the first gas supplying passage 28a. The communication passage 43 is connected to the crank chamber 12 through the second gas supplying passage 28b. The valve chamber 42 and the communication passage 43 are located between the first and second gas supplying passages 28a, 28b.

A valve body 46, which is defined on the middle portion of the rod 45, is arranged in the valve chamber 42. A valve seat 47 is defined at the boundary between the valve chamber 42 and the communication passage 43. The communication passage 43 functions as a valve hole. When the rod 45 moves upward from the state shown in FIG. 2 (lowermost position) to an uppermost position at which the valve body 46 is received by the valve seat 47, the communication passage 43 is closed. In other words, the valve body 46 of the rod 45 functions to adjust the opened amount of the gas supplying passage 28.

A pressure sensing member, or bellows 48, is accommodated in the pressure sensing chamber 44. The top of the bellows 48 is fixed to the valve housing 41. The bottom of the bellows 48 is fixed to the top portion of the rod 45. In the pressure sensing chamber 44, the internal space of the bellows 48 defines a first pressure chamber 49 and the external space of the bellows 48 defines a second pressure chamber 50. The pressure PdH at the first pressure monitoring point P1 is communicated to the first pressure chamber 49 via the first pressure detection passage 35. The pressure PdL at the second pressure monitoring point P2 is communicated to the second pressure chamber 50 via the second pressure detection passage 36. The valve body 46, the bellows 48, and the pressure sensing chamber 44 form a pressure sensing mechanism.

An electromagnetic actuator (pressure difference adjusting actuator) 51 is arranged in the lower portion of the valve housing 41. A cylindrical sleeve 52, which has a closed bottom, extends through the center of the electromagnetic actuator 51. A fixed core 53 is fitted in the sleeve 52. A plunger chamber 54 is defined in the sleeve 52 below the fixed core 53.

A plunger 56, which is made of a magnetic material and axially movable, is retained in the plunger chamber 54. A guide bore 57 extends axially through the center of the fixed core 53. The lower portion of the rod 45, which is axially movable, is arranged in the guide bore 57. The bottom end of the rod 45 is engaged with the top end of the plunger 56 in the plunger chamber 54.

A plunger spring 60 is retained in the plunger chamber 54 between the bottom surface of the sleeve 52 and the plunger 56. The plunger spring 60 urges the plunger 56 toward the fixed core 53. The elastic force of the bellows 48 urges the rod 45 toward the plunger 56. Accordingly, the plunger 56 and the rod 45 always move upward and downward integrally. The force of the bellows 48 is stronger than the force of the plunger spring 60.

A coil 61 is wound around the fixed core 53 and the plunger 56 on the peripheral surface of the sleeve 52. The A/C ECU 72 instructs a drive circuit 78 to supply the coil 61 with power in accordance with the information provided from the A/C state detector 77.

An electromagnetic force (electromagnetic attracting force), which corresponds to the amount of power supplied to the coil 61 by the drive circuit 78, is produced between the plunger 56 and the fixed core 53. The electromagnetic force attracts the plunger 56 toward the fixed core 53. The voltage applied to the coil 61 is adjusted to control the amount of power supplied to the coil 61. Pulse width control (pulse width modulation) is executed to adjust the applied voltage.

As shown in the state of FIG. 2, when the drive circuit 78 does not supply the coil 61 with power (duty ratio Dt=0%), the dominant force in the control valve CV is the downward urging force of the bellows 48. Thus, the rod 45 is arranged at its lowermost position, and the valve body 46 completely opens the communication passage 43. Thus, the pressure of the crank chamber 12 is increased to the highest value possible under the present circumstances. This increases the difference between the pressure of the crank chamber 12 and the pressure of the compression chambers 20 acting on the pistons 17. In this state, the swash plate 15 is arranged at the minimum inclination position, and the displacement of the compressor 40 is minimal.

When the displacement of the compressor 40 is minimal, the shutting valve 34 closes since the pressure of the discharge chamber 22 is lower than the predetermined value. This stops circulating refrigerant through the external refrigerant circuit 30. In this state, the compressor 40 continuously compresses refrigerant gas but the air conditioner does not cool the passenger compartment. In other words, the compressor 40 is substantially deactivated.

The inclination of the swash plate 15 is not zero when arranged at the minimum inclination position. Thus, even if the displacement of the compressor 40 is minimized, refrigerant gas is drawn into the compression chambers 20 from the suction chamber 21, compressed, and then discharged from the compression chambers 20 into the discharge chamber 22. Accordingly, an internal refrigerant circuit extending from the discharge chamber 22, through the first and second gas supplying passages 28a, 28b, the crank chamber 12, the bleeding passage 27, the suction chamber 21, the compression chambers 20, and back to the suction chamber 21 is formed in the compressor 40. Refrigerant and lubricating oil, which is suspended in the refrigerant, circulates through the internal refrigerant circuit. Thus, lubricating oil remains in the compressor 40 and continues to lubricate moving parts (e.g., the swash plate 15 and the shoes 18) in a satisfactory state.

The drive circuit 78 controls a duty ratio Dt to adjust the power supplied to the coil 61. The duty ratio Dt is variable within a predetermined range. When the drive circuit 78 supplies the coil 61 with power corresponding to the minimum duty ratio $DT_{min}$ (Dt>0%) or greater, an upward electromagnetic urging force is added to the force of the plunger spring 60. Thus, the upward urging force overcomes the downward urging force of the bellows 48 and moves the rod 45 upward. In this state, the electromagnetic force, which is added to the upward urging force of the plunger spring 60, counters the downward urging force that is produced by the pressure difference ΔPd between the first and second pressure monitoring points (PdH−PdL) and added to the force of the bellows 48. The valve body 46 of the rod 45 is positioned relative to the valve seat 47 at a location where the upper and lower urging forces are balanced. This adjusts the displacement of the compressor 40. In this state, the compressor 40 is activated and the compressed refrigerant gas is sent to the external refrigerant circuit 30.

For example, when the engine speed Ne decreases, the flow rate of the refrigerant in the refrigerant circuit decreases the downward urging force produced by the pressure difference ΔPd. This upsets the balance between the upward and downward urging forces that was obtained with the electromagnetic force. Accordingly, the rod 45 (valve body 46) moves upward, decreases the opened amount of the communication passage 43, and decreases the pressure of the crank chamber 12. This moves the swash plate 15 toward the maximum inclination position and increases the displacement of the compressor 40. The increase in the displacement of the compressor 40 increases the flow rate of the refrigerant in the refrigerant circuit. As a result, the pressure difference ΔPd increases.

On the other hand, when the engine speed Ne increases, the flow rate of the refrigerant in the refrigerant circuit increases the downward urging force produced by the pressure difference ΔPd. This upsets the balance between the upward and downward urging forces that was obtained with the electromagnetic force. Accordingly, the rod 45 (valve body 46) moves downward, increases the opened amount of the communication passage 43, and increases the pressure of the crank chamber 12. This moves the swash plate 15 toward the minimum inclination position and decreases the displacement of the compressor 40. The decrease in the displacement of the compressor 40 decreases the flow rate of the refrigerant in the refrigerant circuit. As a result, the pressure difference ΔPd decreases.

Further, for example, when the duty ratio Dt of the coil 61 is increased to increase the upward electromagnetic force, this upsets the balance between the upward and downward urging forces that was obtained with the force produced in accordance with the pressure difference ΔPd. Thus, the rod 45 (valve body 46) moves upward, decreases the opened amount of the communication passage 43, and increases the displacement of the compressor 40. As a result, the flow rate of the refrigerant in the refrigerant circuit increases. This increases the pressure difference ΔPd.

When the duty ratio Dt of the coil 61 is decreased to decrease the upward electromagnetic force, this upsets the balance between the upward and downward urging forces that was obtained with the force produced in accordance with the pressure difference ΔPd. Thus, the rod 45 (valve body 46) moves downward, increases the opened amount of the communication passage 43, and decreases the displacement of the compressor 40. As a result, the flow rate of the refrigerant in the refrigerant circuit decreases. This decreases the pressure difference ΔPd.

Accordingly, the control valve CV automatically moves the rod 45 (valve body 46) when the pressure difference ΔPd fluctuates to maintain the pressure difference ΔPd at its target value, which is determined by the duty ratio Dt of the coil 61. The pressure difference ΔPd may be adjusted by an external device that controls the duty ratio Dt of the coil 61.

[Operation of the Engine ECU]

Figure 3:
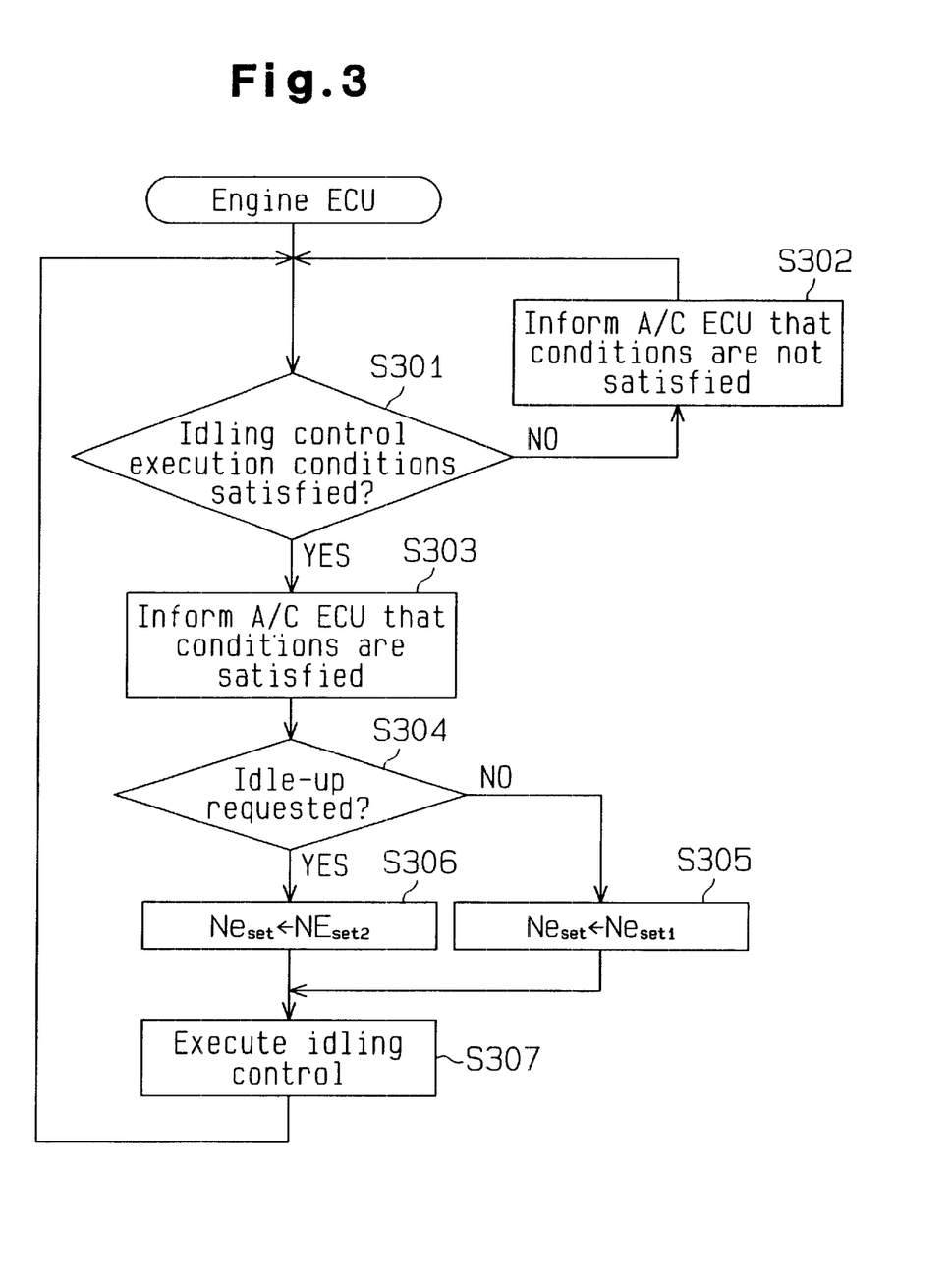
FIG. 3 is a flowchart of a process executed by an engine ECU in the preferred embodiment.

When the engine E is running, the engine ECU 71 executes the process illustrated in FIG. 3.

In step S301, the engine ECU 71 determines whether the conditions for executing an idling state intake air amount control (hereafter simply referred to as idling control) are satisfied by referring to the information provided by the vehicle state detector 73. For example, if the ECU 71 receives information indicating that the vehicle velocity is zero and that the throttle is completely closed from the vehicle state detector 73, the ECU 71 determines that the conditions for executing the idling control are satisfied.

If the engine ECU 71 determines that the conditions for executing the idling control are not satisfied in step S301, the ECU 71 proceeds to step S302 and informs the A/C ECU 72 that the idling control execution conditions are not satisfied. The engine ECU 71 then returns to step S301 from step S302 and repetitively monitors the idling control execution conditions.

If the engine ECU 71 determines that the conditions for executing the idling control are satisfied in step S301, the ECU 71 proceeds to step S303 and informs the A/C ECU 72 that the idling control execution conditions are satisfied. The engine ECU 71 then proceeds from step S303 to step S304 and determines whether the A/C ECU 72 is generating an idle-up request. If the engine ECU 71 determines that an idle-up request is not being generated in step S304, the engine ECU 71 proceeds to step S305 and sets a target idle speed $Ne_{set}$ at a predetermined first value $Ne_{set1}$ (e.g., 700 rpm).

If the engine ECU 71 determines that the A/C ECU 72 is generating an idle-up request, the engine ECU 71 proceeds to step S306 and sets the target idle speed $Ne_{set}$ at a predetermined second value $Ne_{set2}$ (e.g., 900 rpm), which is greater than the first value $Ne_{set1}$.

The engine ECU 71 proceeds from step S305 or step S306 to step S307 and executes idling control, which is known in the art. More specifically, the engine ECU 71 operates the ISCV 65 to increase or decrease the idle state intake air amount while referring to the information of the engine speed Ne from the vehicle state detector 73 so that the engine speed Ne matches the target idle speed $Ne_{set1}$.

[Operation of the A/C ECU]

Normal State

Figure 4:
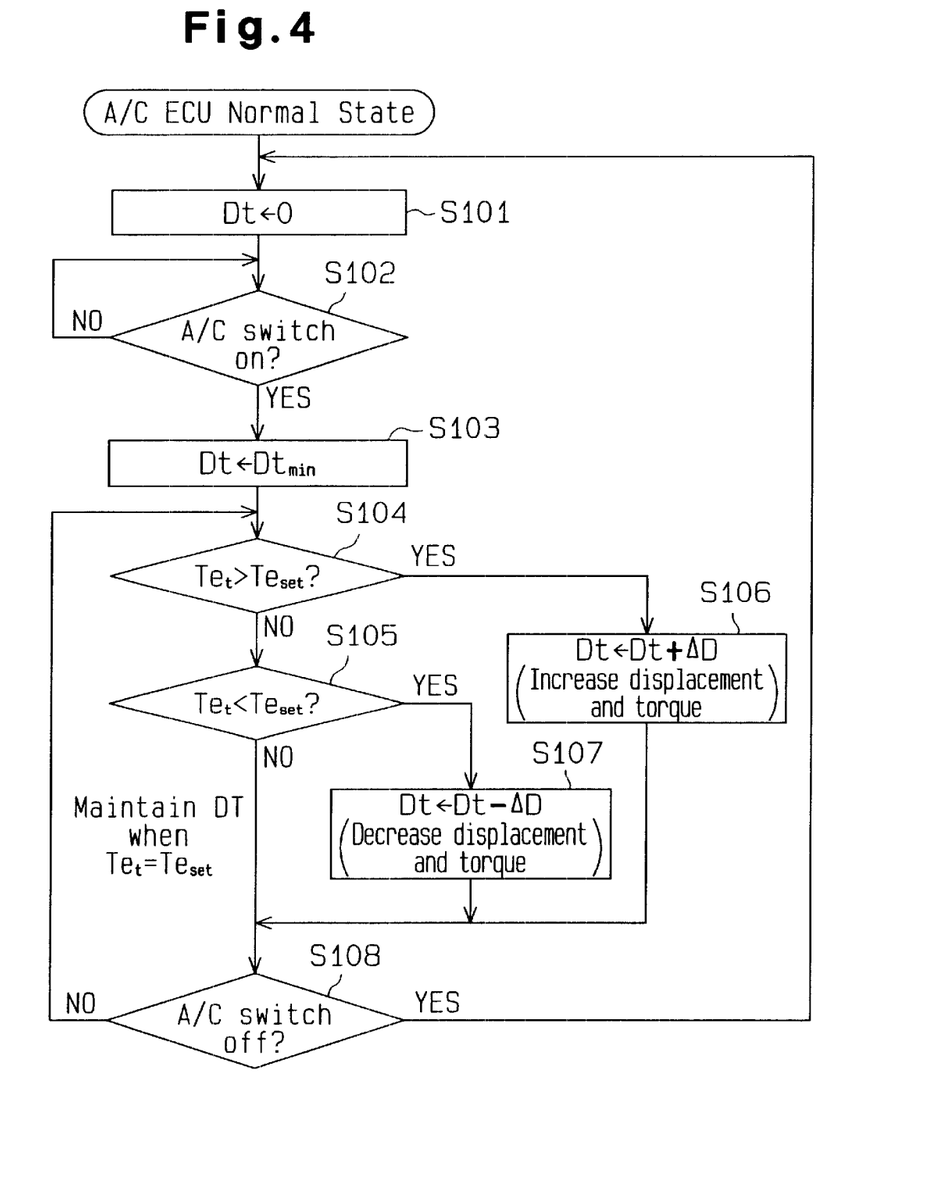
FIG. 4 is a flowchart of a process executed by an air conditioner ECU in a normal state.

In a state in which the engine E is running normally and the engine ECU 71 informs the A/C ECU 72 that the idling control execution conditions are not satisfied, the A/C ECU 72 continues to execute the process illustrated in FIG. 4 until informed that the idling control execution conditions are satisfied.

In step S101, the A/C ECU 72 performs various initializations in accordance with an initialization program. For example, the A/C ECU 72 sets the duty ratio Dt of the control valve CV at an initial value of zero (i.e., the coil 61 not being supplied with power).

In step S102, the A/C ECU 72 checks whether the A/C switch 79 is turned on. If the A/C switch 79 is turned on, the A/C ECU 72 proceeds to step S103 and sets the duty ratio Dt of the control valve CV at the minimum duty ratio $Dt_{min}$.

In step S104, the A/C ECU 72 determines whether the detected temperature $Te_t$ of the temperature sensor 81 is greater than the target temperature $Te_{set}$ set by the temperature setting device 80. If the detected temperature $Te_t$ is not greater than the target temperature $Te_{set}$, the A/C ECU 72 proceeds to step S105 and determines whether the detected temperature $Te_t$ is less than the target temperature $Te_{set}$. If the detected temperature $Te_t$ is not less than the target temperature $Te_{set}$, this indicates that the detected temperature $Te_t$ is equal to the target temperature $Te_{set}$. In such state, there is no need to change the duty ratio Dt. Thus, the A/C ECU 72 proceeds to step S108 without instructing the drive circuit 78 to change the duty ratio Dt.

If the A/C ECU 72 determines that the detected temperature $Te_t$ is greater than the target temperature $Te_{set}$ in step S104, this indicates that the passenger compartment is hot and that the compressor 40 must operate under a large cooling load. The A/C ECU 72 thus proceeds to step S106 and increases the duty ratio Dt by a predetermined grading amount $\Delta D$ and instructs the drive circuit 78 to change the duty ratio Dt to the corrected value (Dt+$\Delta D$). This slightly decreases the opened amount of the control valve CV and increases the displacement of the compressor 40. As a result, the amount of heat exchanged by the evaporator 33 increases and the temperature $Te_1$ decreases.

If the A/C ECU 72 determines that the detected temperature $Te_t$ is less than the target temperature $Te_{set}$ in step S105, this indicates that the temperature of the passenger compartment does not have to be decreased and that the cooling load applied to the compressor 40 is small. The A/C ECU 72 thus proceeds to step S107 and decreases the duty ratio Dt by a predetermined grading amount $\Delta D$ and instructs the drive circuit 78 to change the duty ratio Dt to the corrected value (Dt–$\Delta D$). This slightly increases the opened amount of the control valve CV and decreases the displacement of the compressor 40. As a result, the amount of heat exchanged by the evaporator 33 decreases and the temperature $Te_1$ increases.

At step S108, the A/C ECU 72 determines whether the A/C switch 79 is turned off. If the A/C switch 79 is not turned off, the A/C ECU 72 returns to step S104 and repeats the subsequent steps. If the A/C switch 79 is turned off, the A/C ECU 72 proceeds to step S101. This sets the duty ratio Dt of the power supplied to the coil 61 of the control valve CV at zero. In such state, the compressor 40 is substantially deactivated.

The correction of the duty ratio Dt in step S106 and step S107 and the automatic valve opening adjustment of the control valve CV gradually converge the detected temperature $Te_t$ to the target temperature $Te_{set}$.

Idle State

Figure 5:
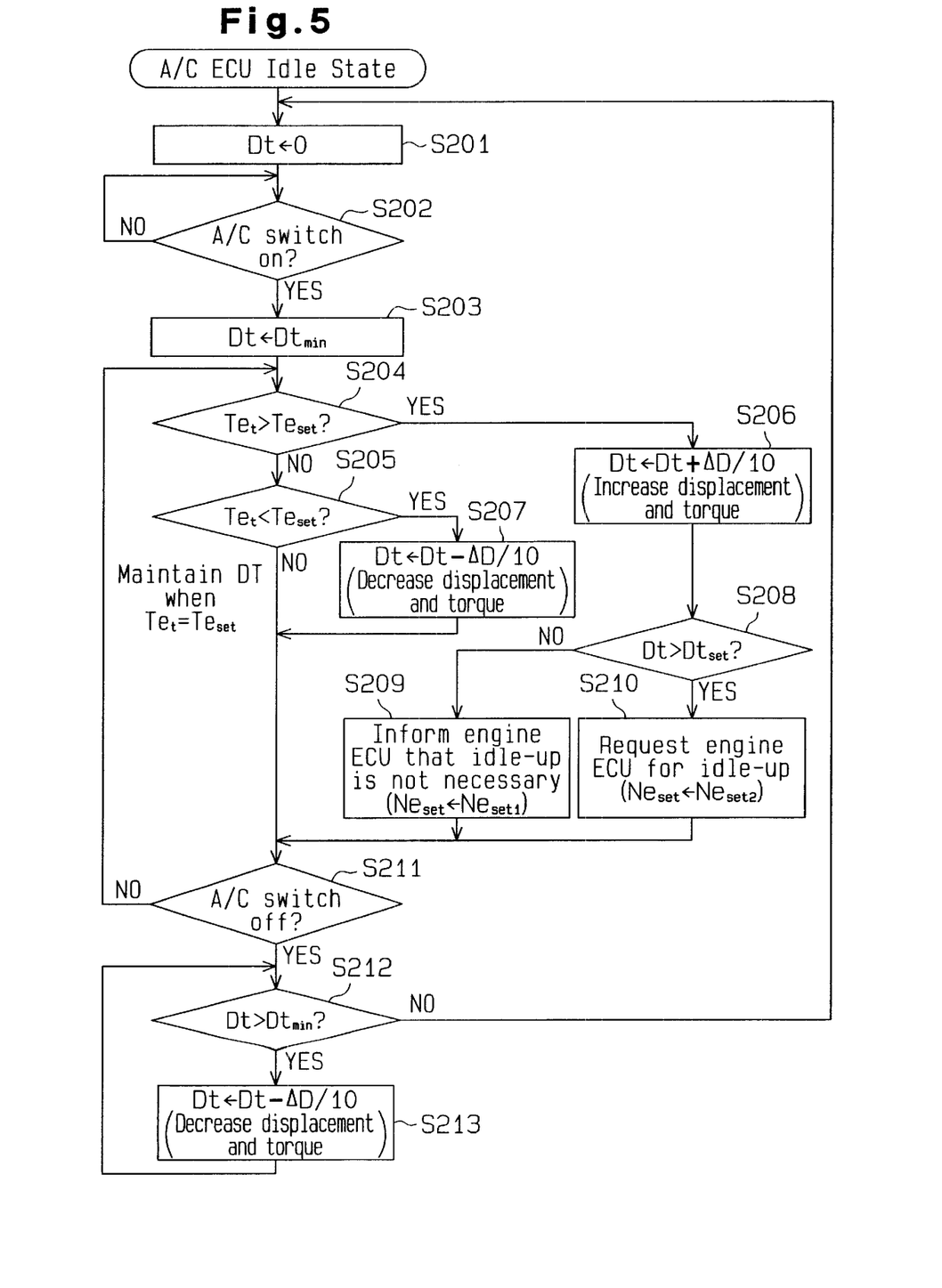
FIG. 5 is a flowchart of a process executed by the air conditioner electronic control unit (ECU) in an idle state.

If the engine ECU 71 informs the A/C ECU 72 that the idling control execution conditions are satisfied when the engine E is running, the A/C ECU 72 continues to execute the process illustrated in FIG. 5 until informed that the idling control execution conditions are not satisfied. The engine ECU 71 uses the first value $Ne_{set}$ as the target idle speed $Ne_{set}$ when executing the idling control of the engine E.

In step S201, the A/C ECU 72 performs initialization in the same manner as in step S101 of FIG. 4. In step S202, the A/C ECU 79 checks whether the A/C switch 79 is turned on or off in the same manner as step S102. Further, when the A/C switch 79 is turned on, the A/C ECU 72 proceeds to step S203 and sets the duty ratio Dt of the control valve CV at the minimum duty ratio $Dt_{min}$ in the same manner as in step S103. Then, in steps S204 and S205, the A/C ECU 72 determines the relationship between the detected temperature $Te_t$ and the target temperature $Te_{set}$ in the same manner as in steps S104 and S105.

If the A/C ECU 72 determines that the detected temperature $Te_t$ is greater than the target temperature $Te_{set}$ in step S204, the A/C ECU 72 proceeds to step S206 and increases the duty ratio Dt by a predetermined grading amount $\Delta D/10$ and instructs the drive circuit 78 to change the duty ratio Dt to the corrected value (Dt+$\Delta D/10$). If the A/C ECU 72 determines that the detected temperature $Te_t$ is less than the target temperature $Te_{set}$ in step S205, the A/C ECU 72 proceeds to step S207 and decreases the duty ratio Dt by the predetermined grading amount $\Delta D/10$ and instructs the drive circuit 78 to change the duty ratio Dt to the corrected value (Dt–$\Delta D/10$).

Accordingly, in steps S206 and S207, the grading amount used to change the duty ratio Dt when the engine E is idling is less than that used to change the duty ratio Dt when the engine E is running normally (in the preferred embodiment, one tenth). The grading amount $\Delta D/10$ is set so that the duty ratio Dt increases from the minimum value $Dt_{min}$ to the maximum value of the duty ratio range within about 5 to 15 seconds.

Therefore, in comparison to when the engine E is running normally, the duty ratio Dt is gradually changed by a smaller amount when the engine E is idling. In other words, more time is required to change the duty ratio Dt to a certain value. Thus, the displacement of the compressor 40 varies in a gradual manner, and the torque required to drive the compressor 40 changes in a gradual manner. As a result, the engine ECU 71 responds properly to fluctuations of the engine speed Ne, which is caused by changes in the torque of the compressor 40, when performing idling control. This prevents the difference between the engine speed E and the target idle speed $Ne_{set}$ from becoming large and destabilizing the idling state of the engine E.

The A/C ECU 72 proceeds from step S206 to step S208 to determine whether the duty ratio Dt of the control valve CV is greater than a predetermined threshold value $Dt_{ref}$. The threshold value $Dt_{ref}$ corresponds to the pressure difference $\Delta Pd$ required for the compressor 40 to obtain its maximum displacement in a state in which the engine speed Ne is equal to the first target idle speed $Ne_{set1}$.

Accordingly, when the duty ratio Dt is not greater than the predetermined threshold value $Dt_{ref}$ in step S208, the necessary flow rate of the refrigerant in the refrigerant circuit may be obtained by increasing the displacement of the compressor 40 even if the engine speed Ne is equal to the first target idle speed $Ne_{set1}$. In other words, the refrigerant flow rate may be increased without increasing the engine speed Ne when the engine E is idling. In step S209, the A/C ECU 72 thus informs the engine ECU 71 that there is no need to execute the idle-up control. Hence, the engine ECU 71 performs idling control using the first target idle speed $Ne_{set1}$ (refer to step S305 of FIG. 3).

When the duty ratio Dt is greater than the predetermined threshold value $Dt_{ref}$ in step S208, the necessary flow rate of the refrigerant in the refrigerant circuit cannot be obtained even if the displacement of the compressor 40 is increased as long as the engine speed Ne is equal to the first target idle speed $Ne_{set1}$. In step S210, the A/C ECU 72 thus requests the engine ECU 71 to execute the idle-up control. Hence, the engine ECU 71 performs idling control using the second target idle speed $Ne_{set2}$ (refer to step S306 of FIG. 3).

The A/C ECU 72 proceeds from step S205, S207, S209, or S210 to step S211 to determine whether the A/C switch 79 is turned off. If the A/C switch 79 is not turned off, the A/C ECU 72 returns to step S204 and changes the duty ratio Dt based on the relationship between the target temperature $Te_{set}$ and the detected temperature $Te_t$.

In step S211, if the A/C ECU 72 determines that the A/C switch 79 is turned off, the A/C ECU 72 proceeds to step S212 and determines whether the duty ratio Dt is greater than the minimum duty ratio $Dt_{min}$. If the duty ratio Dt is not greater than the minimum duty ratio $Dt_{min}$, the A/C ECU 72 returns to step S201 to set the duty ratio Dt to zero and substantially deactivate the compressor 40. The torque required to drive the compressor 40 is small as long as the duty ratio Dt is less than or equal to the minimum duty ratio $Dt_{min}$. Thus, deactivation of the compressor 40 subtly affects the engine speed Ne since the torque required to drive the compressor 40 is minimized.

If the duty ratio Dt is greater than the minimum duty ratio $Dt_{min}$ in step S212, the A/C ECU 72 proceeds to step S213. In step S213, the A/C ECU 72 decreases the duty ratio Dt by the predetermined grading amount $\Delta D/10$ and instructs the drive circuit 78 to change the duty ratio Dt to the corrected value (Dt–$\Delta D/10$). The A/C ECU 72 therefore gradually decreases the duty ratio Dt by repeating step S213 even if the duty ratio Dt is greater than the minimum duty ratio $Dt_{min}$ by a significant amount. This gradually decreases the displacement of the compressor 40 and gradually decreases the torque required to drive the compressor 40. The gradual torque decrease enables the engine ECU 71 to stabilize the idle speed as it executes the idling control. This prevents a sudden torque decrease from increasing the engine speed Ne in a sudden manner (a state referred to as racing) when the engine E is idling.

The preferred embodiment has the advantages described below.

(1) When the engine E is idling, the displacement of the compressor 40 gradually increases and decreases. Thus, the resulting change of the torque required to drive the compressor is gradual enough that the engine ECU 71 can stabilize the engine E through the idling control. Accordingly, the engine E continues to idle stably such that the engine E does not stall or race. As a result, the engine speed E may be decreased when the engine E is idling. In other words, the target idle speed $Ne_{set}$ may be easily be set at a low value.

(2) If the A/C switch 79 is turned off when the engine E is idling, the displacement of the compressor 40 is gradually decreased before the compressor 40 is deactivated. Since the compressor 40 is not suddenly deactivated, the engine E is prevented from racing without having to execute a special control (e.g., decreasing the target idle speed $Ne_{set}$) when the A/C switch 79 is turned off.

(3) The target idle speed of the engine E is increased only when cooling is required even if the compressor 40 is activated. This reduces the vibrations and noise generating from the vehicle that would result from frequent changing of the target idle speed $Ne_{set}$. Further, if the target idle speed $Ne_{set}$ were to be increased even though cooling were not necessary, this would decrease the fuel efficiency of the vehicle. The present invention avoids such circumstance.

(4) The threshold value $Dt_{ref}$, which is used to determine whether to increase the target idle speed of the engine E (step S208 of FIG. 5), corresponds to the pressure difference $\Delta Pd$ required for the compressor 40 to obtain its maximum displacement in a state in which the engine speed Ne is equal to the first target idle speed $Ne_{set1}$. Thus, the idle speed is increased only when necessary to increase the cooling capacity.

(5) The control valve CV of the above embodiment functions to change the pressure difference between two pressure monitoring points. However, a control valve that functions to change the suction pressure may be used instead. Such control valve, for example, includes a pressure sensing mechanism, which mechanically detects the suction pressure and moves a valve body to absorb fluctuations of the detected suction pressure, and a pressure difference adjusting actuator, which varies the suction pressure used by the pressure sensing mechanism to position the valve body.

When employing such control valve, which sets a target suction pressure to vary the displacement, the displacement of the compressor 40 may not vary gradually even when the target suction value is changed. For example, if the amount of heat exchanged by the evaporator 33 were to be large and the actual suction pressure were to be significantly greater than the target suction pressure, the displacement of the compressor 40 would become maximal soon after the A/C switch 79 is turned on even if the pressure difference adjusting actuator gradually changes the force applied to the pressure sensing mechanism. Thus, to prevent the engine E from stalling due to a sudden increase in the torque required to drive the compressor 40 when the engine E is idling, idle-up control must be executed when the A/C switch 79 is turned on.

However, in the present invention, the A/C ECU 72 does not use the suction pressure, which is affected by the amount of heat exchanged by the evaporator 33, to control the displacement of the compressor. The A/C ECU 72 feedback controls the displacement of the compressor 40 based on the pressure difference $\Delta Pd$ between the two pressure monitoring points P1, P2 that reflect the flow rate of the refrigerant in the refrigerant circuit. Accordingly, the duty ratio Dt of the control valve CV is gradually changed to gradually vary the displacement of the compressor regardless of the amount of heat exchanged by the evaporator 33. Thus, the idle speed of the engine E may also be decreased with such structure. In other words, the target idle speed $Ne_{set}$ may easily be set at a low value.

It should be apparent to those skilled in the art that the present invention may be embodied in many other specific forms without departing from the spirit or scope of the invention. Particularly, it should be understood that the present invention may be embodied in the following forms.

Figure 6:
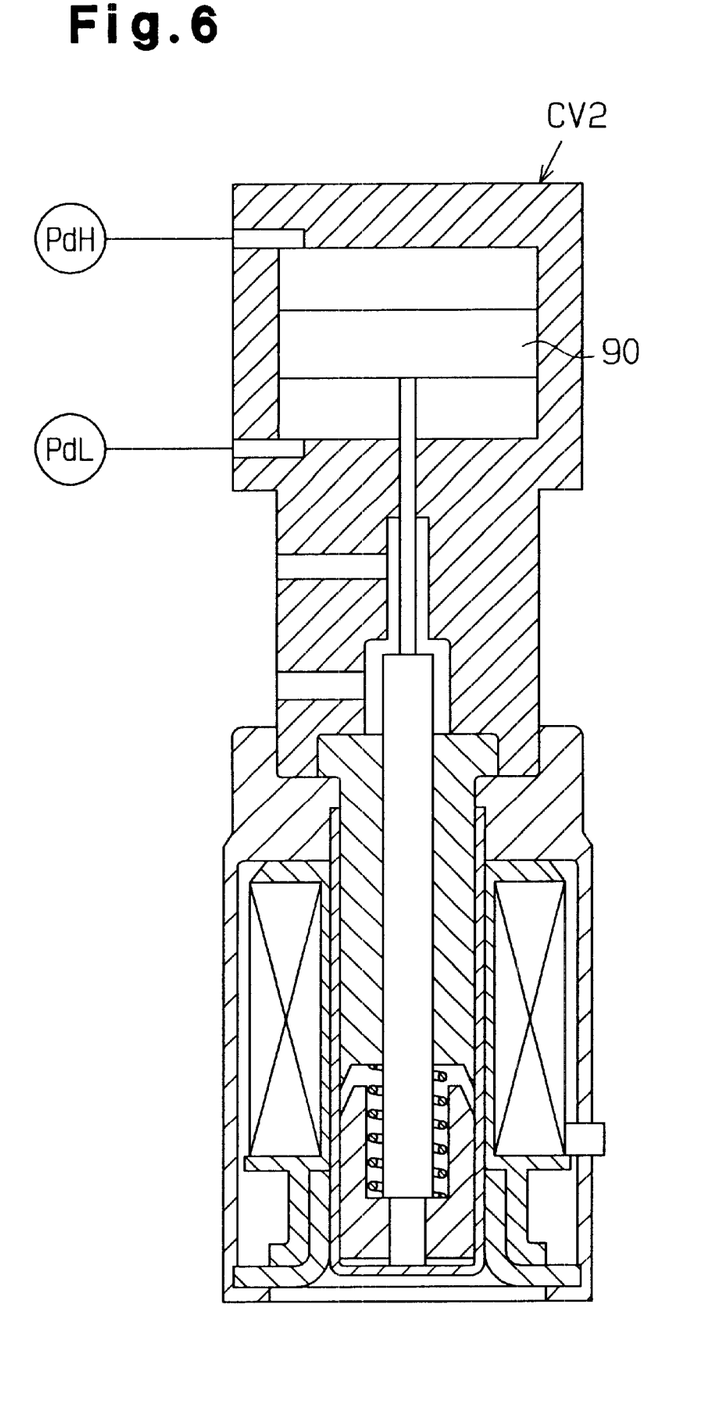
FIG. 6 is a cross-sectional view showing another control valve that may be incorporated in the compressor of FIG. 1.

Referring to FIG. 6, the compressor 40 may employ a control valve CV2, which incorporates a movable partition 90 to serve as the pressure sensing member in lieu of the bellows 48. In this case, the pressure PdH at the first pressure monitoring point P1 is applied to one side of the partition 90, and the pressure PdL at the second pressure monitoring point P2 is applied to the other side of the partition 90. The partition 90 moves in accordance with the difference between the pressures PdH and PdL and functions in accordance with the bellows 48 of the preferred embodiment.

In the process performed by the A/C ECU 72 when the engine E is idling, the grading amount of the duty ratio in steps S206 and S207 (refer to FIG. 5) may be equal to the grading value $\Delta D$ of the duty ratio Dt used in steps S106 and S107 (refer to FIG. 4) when the engine E is running normally. In this case, a step for delaying the time from when the A/C ECU 72 performs step S206 to when the A/C ECU 72 performs step S207 is included between the steps S206 and S207. This changes the duty ratio Dt more gradually in comparison to when the engine W is running normally.

A clutch mechanism electrically controlled by an external device to selectively connect and disconnect the drive source (engine E) and the compressor 40, such as an electromagnetic clutch, may be used as the power transmission mechanism PT.

The first pressure monitoring point P1 may be located in a suction pressure region defined between the evaporator 33 and the suction chamber 21, and the second pressure monitoring point P2 may be located in the same suction pressure region downstream of the first pressure monitoring point P1.

The first pressure monitoring point P1 may be located in a discharge pressure region defined between the discharge chamber 22 and the condenser 31, and the second pressure monitoring point P2 may be located in a suction pressure region.

The first pressure monitoring point P1 may be located in the discharge pressure region, and the second pressure monitoring point P2 may be located in the crank chamber 12.

Alternatively, the second pressure monitoring point P2 may be located in the crank chamber 12, and the first pressure monitoring point P1 may be located in the section pressure region. In other words, one of the pressure monitoring points P1 and P2 may be located in the crank chamber 12, which defines an intermediate pressure region.

The communication passage 43 may be connected to the discharge chamber 22 through the first gas supplying passage 28a, and the valve chamber 42 may be connected to the crank chamber 12 through the second gas supplying passage 28b. This decreases the pressure difference between the communication passage 43 and the second pressure chamber 50, which is adjacent to the communication passage 43. As a result, pressure leakage between the communication passage 43 and the second pressure chamber 50 is reduced and the compressor displacement is controlled with high accuracy.

A control valve connected to the bleeding passage 27 instead of the gas supplying passages 28a, 28b may be employed in lieu of the control valve to adjust the opening of the bleeding passage 27 and control the pressure of the crank chamber 12.

The variable displacement compressor 40 may be of a type that uses a wobble type swash plate.

The present examples and embodiments are to be considered as illustrative and not restrictive, and the invention is not to be limited to the details given herein, but may be modified within the scope and equivalence of the appended claims.

What is claimed is:

1. A vehicle air conditioner including a refrigerant circuit that incorporates a variable displacement compressor driven by an engine of the vehicle, the air conditioner comprising:
    a control valve for varying the displacement of the compressor; and
    an air conditioner control unit for controlling the control valve;
    wherein the control valve includes:
        a pressure sensing mechanism having a valve body and a pressure sensing member connected to the valve body and moved in accordance with a pressure difference between two pressure monitoring points located along the refrigerant circuit, wherein the pressure difference corresponds to the displacement of the compressor and alters the moved amount of the pressure sensing member; and
        a pressure difference adjusting actuator controlled by the air conditioner control unit, wherein the pressure difference adjusting actuator applies a force, which counters the movement of the pressure sensing member, to the valve body to move the valve body and alter the moved amount of the pressure sensing member, the pressure difference adjusting actuator further adjusting the force applied to the valve body to alter the moved amount of the pressure sensing member and vary the displacement of the compressor;
    wherein the air conditioner control unit changes the force of the pressure difference adjusting actuator applied to the valve body to adjust the pressure difference and vary the displacement of the compressor, wherein the changes in force when the engine is running at an idle speed is more gradual than when the engine is running at a speed other than the idle speed.

2. The vehicle air conditioner according to claim 1, wherein the air conditioner control unit repetitively changes the force of the pressure difference adjusting actuator by predetermined amounts.

3. The vehicle air conditioner according to claim 2, wherein the air conditioner control unit is connected to a switch for activating the air conditioner and for generating a signal when the air conditioner is activated and deactivated, the air conditioner control unit repetitively increasing the force of the pressure difference adjusting actuator by the predetermined amounts based on the signal generated by the switch.

4. The vehicle air conditioner according to claim 2, wherein the air conditioner control unit is connected to a switch for activating the air conditioner and for generating a signal when the air conditioner is activated and deactivated, the air conditioner control unit repetitively decreasing the force of the pressure difference adjusting actuator by the predetermined amounts based on the signal generated by the switch.

5. The vehicle air conditioner according to claim 3, wherein the air conditioner control unit determines whether the idle speed will remain stable when increasing the force of the pressure difference adjusting actuator applied to the valve body to vary the displacement of the compressor.

6. The vehicle air conditioner according to claim 5, further comprising an engine control unit for controlling the idle speed of the engine, wherein the engine control unit increases the idle speed when the air conditioner control unit determines that the idle speed will not remain stable when increasing the force of the pressure difference adjusting actuator applied to the valve body to vary the displacement of the compressor.

7. The vehicle air conditioner according to claim 1, wherein the air conditioner control unit compares an actual temperature and a target temperature of a passenger compartment of the vehicle to determine the force of the pressure difference adjusting actuator applied to the valve body.

8. A method for controlling a vehicle air conditioner including a refrigerant circuit that incorporates a variable displacement compressor driven by an engine of the vehicle, a pressure sensing mechanism, and a pressure difference adjusting actuator, wherein the pressure sensing mechanism has a valve body and a pressure sensing member, which is connected to the valve body and moved in accordance with the pressure difference between two pressure monitoring points located along the refrigerant circuit, and wherein the pressure difference adjusting actuator applies a force, which counters the movement of the pressure sensing member, to the valve body to move the valve body, and changes the force applied to the valve body to alter the moved amount of the pressure sensing member, adjust the pressure difference, and vary the displacement, the method comprising the step of:
    changing the force of the pressure difference adjusting actuator applied to the valve body to adjust the pressure difference and vary the displacement of the compressor when the engine is running at an idle speed, wherein the changes in force when the engine is running at the idle speed are more gradual than when the engine is running at a speed other than the idle speed.

9. The method according to claim 8, wherein the step for changing the force of the pressure difference adjusting actuator includes repetitively changing the force of the pressure difference adjusting actuator by predetermined amounts.

10. The method according to claim 8, further comprising the step of:

checking the activation of the air conditioner, wherein the step for changing the force of the pressure difference adjusting actuator is performed when activation of the air conditioner is confirmed.

11. The method according to claim 9, wherein the step for changing the force of the pressure difference adjusting actuator includes repetitively increasing the force of the pressure difference adjusting actuator by the predetermined amounts.

12. The method according to claim 9, wherein the step for changing the force of the pressure difference adjusting actuator includes repetitively decreasing the force of the pressure difference adjusting actuator by the predetermined amounts.

13. The method according to claim 8, further comprising the step of:

checking the deactivation of the air conditioner before the step for changing the force of the pressure difference adjusting actuator is performed.

14. The method according to claim 8, further comprising the step of:

determining whether the idle speed remains stable when the displacement of the compressor is varied.

15. The method according to claim 14, further comprising the step of:

increasing the idle speed when determined that the idle speed will not remain stable.

16. The method according to claim 8, further comprising the step of:

comparing an actual temperature and a target temperature of a passenger compartment of the vehicle and determining the force of the pressure difference adjusting actuator applied to the valve body in accordance with the pressure difference.

* * * * *